No. 833,615. PATENTED OCT. 16, 1906.
N. v. MOLTKE.
SUPPORT FOR BICYCLES.
APPLICATION FILED MAY 25, 1905.

Witnesses:
Chas Goldberg
Loretta Flynn

Inventor:
Nancy v. Moltke
By Knight Bros
Attorneys.

UNITED STATES PATENT OFFICE.

NANCY v. MOLTKE, OF PARCHIM, GERMANY.

SUPPORT FOR BICYCLES.

No. 833,615. Specification of Letters Patent. Patented Oct. 16, 1906.

Application filed May 25, 1905. Serial No. 262,246.

*To all whom it may concern:*

Be it known that I, NANCY V. MOLTKE, of Parchim, Germany, a subject of the King of Prussia, German Emperor, (whose post-office address is Moltkehaus of Parchim, Grand Duchy of Mecklenburg, German Empire,) have invented a new and useful Support for Bicycles, of which the following is a specification.

The present invention has for its object to support in a convenient manner a bicycle on the road; and the invention consists in providing in each side of the bicycle a leg adapted to being freely moved in all directions. The legs are suspended in eyes clamped to the lower bar of the frame and support the bicycle when their free ends are let down on the ground. In turned-up position they are laid in the upwardly-bent forked ends of a transverse bar attached by clamps to the upper part of the lower bar of the frame. The said horizontal bar is hinged to the clamp, by which it is secured to the frame of the bicycle, and is provided with a handle extending upward, to be in easy reach of the hand of the rider, so that the rider by moving the handle can turn the horizontal bar in the position to let the forward end of the legs drop out of the forks onto the ground.

The invention is illustrated on the annexed drawings, in which—

Figure 1:
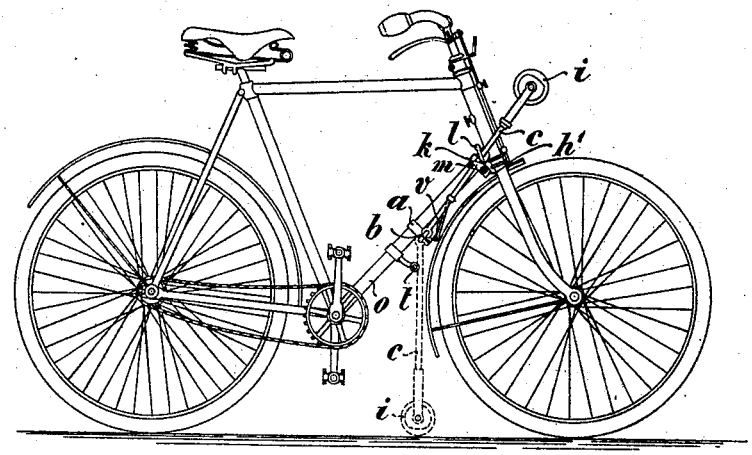
Figure 2:
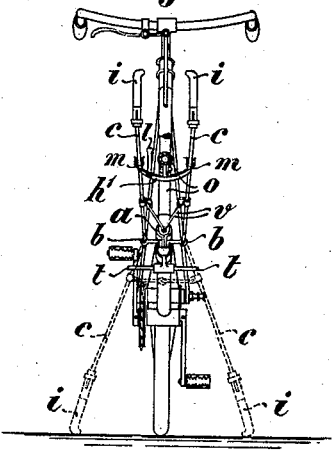
Figure 3:
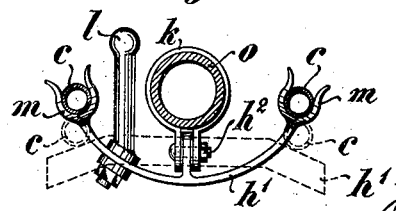
Figure 4:
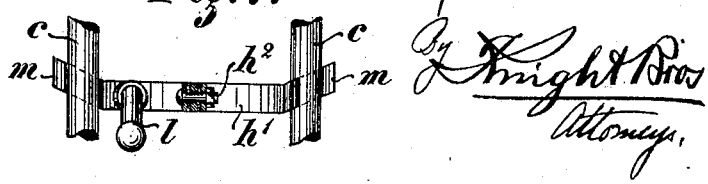

Figure 1 is a side view, and Fig. 2 a front view, of a bicycle provided with the support. Fig. 3 is a section through the lower bar of the bicycle-frame and the transverse bar attached thereto. Fig. 4 is a top view of the transverse bar with the supporting-legs laid in the upwardly-bent forked ends.

$c\ c$ are the two supporting-legs suspended in eyes $b$, clamped to the lower bar $o$ of the bicycle-frame. They are of such length that if their forward ends are let down to the ground they support the bicycle in upright position. A transverse bar $h'$, having upwardly-bent forked ends $m$, is by ring $k$ clamped to the upper end of the lower bar $o$ of the bicycle.

When the bicycle is in use, the forward ends of the supporting-legs are laid in the forked ends of the said transverse bar. The said bar is, by means of a bolt $h^2$, hinged to the clamp $k$, as shown on the drawings, and provided with a handle $l$, extending upward to be in reach of the hand of the rider, so that the rider can, by moving the said handle, turn the transverse bar $h'$ in such position that the ends of the supporting-legs resting in the forks $m$ drop down on the ground. The prongs of the forks are of a shape as to facilitate the gliding of the supporting-legs out of said forks, as shown by dotted lines in Fig. 3. The forward end of each of the supporting-legs, if desired, may be provided with a roller, as shown at $i$, Fig. 1, so that the supports when left down can slide on the ground until the rider has slackened the speed of the bicycle and brought it to a standstill, in which position it is supported by the said supporting-legs. A stop $t$, clamped to the lower end of the bar of the bicycle-frame, prevents the supporting-legs on dropping down from striking against the legs of the rider, while a pair of links $v$, secured to the frame, prevents the spreading of the supporting-legs. After starting on the supported wheel the rider has first to bring the transverse bar in normal position. He can then, when on the way, lift the supporting-legs one after the other with the hand and lay them in the forks of the transverse bar.

What I claim, and desire to secure by Letters Patent of the United States, is—

1. The combination with a bicycle-frame, of a pair of supporting-arms movably clamped thereto and a transverse bar provided with upturned forked ends clamped to a portion of said frame and adapted to receive said supporting-arms.

2. The combination with a bicycle-frame, of a pair of eyeleted arms extending transversely of said frame and clamped thereto, a pair of supporting-arms suspended therefrom, a bar clamped transversely of said frame and in front of said eyeleted arms and provided with upturned forked ends adapted to receive said supporting-arms and means for actuating said bar.

3. The combination with a bicycle-frame of eyeleted arms extending transversely thereof and clamped thereto, and a pair of supporting-arms suspended therefrom, of a second bar clamped to a portion of said frame and transversely thereof and provided with upturned forked ends adapted to receive said supporting-arms, means for actuating said bar, and a stop for limiting the backward movement of said supporting-arms, secured to said frame.

In testimony whereof I have hereunto set my hand in presence of two subscribing witnesses.

NANCY v. MOLTKE.

Witnesses:
 HENRY HASPER,
 WOLDEMAR HAUPT.